United States Patent
Chen et al.

(10) Patent No.: US 11,044,147 B2
(45) Date of Patent: Jun. 22, 2021

(54) RESOURCE CONFIGURATION METHOD AND APPARATUS

(71) Applicant: Huawei Technologies Co., Ltd., Guangdong (CN)

(72) Inventors: Zheng Chen, Beijing (CN); Hao Sun, Beijing (CN); Yan Cheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 11 days.

(21) Appl. No.: 16/367,510

(22) Filed: Mar. 28, 2019

(65) Prior Publication Data
US 2019/0229986 A1    Jul. 25, 2019

Related U.S. Application Data

(63) Continuation of application No. PCT/CN2017/103391, filed on Sep. 26, 2017.

(30) Foreign Application Priority Data

Sep. 29, 2016 (CN) .......................... 201610872083.2

(51) Int. Cl.
*H04W 4/00* (2018.01)
*H04L 12/24* (2006.01)
(Continued)

(52) U.S. Cl.
CPC ........ *H04L 41/0803* (2013.01); *H04L 5/0007* (2013.01); *H04L 5/0053* (2013.01);
(Continued)

(58) Field of Classification Search
None
See application file for complete search history.

(56) References Cited

U.S. PATENT DOCUMENTS

2011/0045860 A1    2/2011   Nam et al.
2011/0222489 A1    9/2011   Awad
(Continued)

FOREIGN PATENT DOCUMENTS

CN    102204155 A    9/2011
CN    102448175 A    5/2012
(Continued)

OTHER PUBLICATIONS

R1-166149 Huawei et al., "Details of two-level DCI schemes for short TTI", 3GPP TSG RAN WG1 Meeting #86, Gothenburg, Sweden, Aug. 22-26, 2016, total 6 page.
(Continued)

*Primary Examiner* — Clemence S Han
(74) *Attorney, Agent, or Firm* — Kilpatrick Townsend & Stockton LLP

(57) ABSTRACT

This application discloses a resource configuration method and an apparatus, applied to a two-level control channel structure that includes a level-1 control channel and a level-2 control channel. The method includes: obtaining, by a base station, receive bandwidth of a terminal; generating first information based on the receive bandwidth, where the first information is used for determining a frequency domain resource range used by a downlink data channel; generating second information based on the first information, where the second information is used to indicate a location of the downlink data channel within the frequency domain resource range; and sending, by the base station, the first information and the second information to the terminal.

18 Claims, 9 Drawing Sheets

(51) Int. Cl.
*H04W 72/04* (2009.01)
*H04L 5/00* (2006.01)
*H04W 72/12* (2009.01)
*H04W 88/08* (2009.01)

(52) U.S. Cl.
CPC .......... *H04L 5/0092* (2013.01); *H04L 5/0094* (2013.01); *H04W 72/04* (2013.01); *H04W 72/1278* (2013.01); *H04W 88/08* (2013.01)

(56) References Cited

U.S. PATENT DOCUMENTS

| | | | | |
|---|---|---|---|---|
| 2014/0177547 | A1* | 6/2014 | Guo | H04L 5/0053 370/329 |
| 2017/0244535 | A1* | 8/2017 | Islam | H04L 5/0037 |
| 2017/0251466 | A1* | 8/2017 | Astely | H04L 5/0055 |
| 2017/0332377 | A1* | 11/2017 | Tseng | H04W 72/0413 |
| 2018/0115984 | A1* | 4/2018 | Sahlin | H04W 72/14 |
| 2018/0242347 | A1* | 8/2018 | Sahlin | H04W 72/14 |
| 2018/0376495 | A1* | 12/2018 | Lee | H04W 48/12 |
| 2018/0376497 | A1* | 12/2018 | You | H04W 72/1284 |
| 2019/0181991 | A1* | 6/2019 | Andgart | H04W 72/0446 |
| 2019/0281499 | A1* | 9/2019 | Larsson | H04W 28/16 |

FOREIGN PATENT DOCUMENTS

| | | |
|---|---|---|
| CN | 103220796 A | 7/2013 |
| CN | 103369675 A | 10/2013 |

OTHER PUBLICATIONS

R1-167082 Nokia et al.,"On two-level DL control channel design for shorter TTI operation", 3GPP TSG-RAN WG1 Meeting #86,Gothenburg, Sweden, Aug. 22-26, 2016,total 6 pages.

NEC Group,"PDSCH Resource Allocation in presence of ePDCCH", 3GPP TSG RAN WG1 Meeting #70 R1-123251, Qingdao, China, Aug. 13-17, 2012,total 6 pages.

* cited by examiner

RESOURCE CONFIGURATION METHOD AND APPARATUS

CROSS-REFERENCE TO RELATED APPLICATIONS

This application is a continuation of International Application No. PCT/CN2017/103391, filed on Sep. 26, 2017, which claims priority to Chinese Patent Application No. 201610872083.2, filed on Sep. 29, 2016. The disclosures of the aforementioned applications are hereby incorporated by reference in their entireties.

TECHNICAL FIELD

The present application relates to the field of communications technologies, and in particular, to a resource configuration method and an apparatus.

BACKGROUND

Wireless communications is a communication mode in which information is exchanged by using a feature that an electromagnetic wave signal is propagated in free space. Wireless communications technologies develop fastest and are most widely applied in the communications field, and have penetrated into all aspects of people's lives and work. All of 3G, 4G, 5G, WLAN, Bluetooth, a wideband satellite system, a digital television, and the like are applications of the wireless communications technologies. In a wireless communications system, there are limited wireless channels, and wireless channels are also extremely valuable resources. To improve a capacity of the system, channel resources need to be allocated properly. Because a data volume of downlink transmission is far greater than a data volume of uplink transmission, it is particularly important to properly allocate downlink channel resources.

Allocating frequency domain resources of downlink channels is allocating frequency domain resources of downlink system bandwidth. In an LTE system, a basic unit of the downlink system bandwidth in frequency domain is a resource block (RB). Because the system bandwidth is equal to user equipment (UE) bandwidth, a resource block group (RBG) size in downlink resource allocation is bound to the system bandwidth. Therefore, downlink resources can be allocated for a terminal only based on location information of frequency domain resources of the entire system bandwidth. However, in some cases, a value of the UE bandwidth may be less than a value of the system bandwidth. If a physical downlink shared channel (PDSCH) resource to be received by UE is still scheduled based on the RBG size that is related to the system bandwidth, flexibility of UE resource scheduling is restricted, and frequency selection performance is affected. In addition, information overheads that are used for downlink resource allocation and that are in a control channel in the LTE system are relatively large.

SUMMARY

To improve flexibility of PDSCH resource scheduling and reduce information overheads of downlink resources, this application discloses a resource configuration method and an apparatus. Specific technical solutions include the following.

According to a first aspect, this application provides a resource configuration method, applied to a two-level control channel structure that includes a level-1 control channel and a level-2 control channel. The method includes: obtaining, by a base station, receive bandwidth of a terminal; generating, by the base station, first information based on the receive bandwidth, where the first information is used for determining a frequency domain resource range used by a downlink data channel; generating, by the base station, second information based on the first information, where the second information is used to indicate a location of the downlink data channel within the frequency domain resource range; and sending, by the base station, the first information to the terminal through the level-1 control channel, and sending the second information to the terminal through the level-2 control channel.

This aspect provides the method for allocating a PDSCH resource through joint indication by using control channels of two levels. According to the method, the based station generates the first information and the second information based on the obtained receive bandwidth, and further configures a size of a time-frequency resource of the level-2 control channel based on a downlink resource scheduling status, thereby improving flexibility of PDSCH resource allocation. In addition, bandwidth regions are obtained through division based on the generated first information in the level-1 control channel, and a resource allocation location within a bandwidth region set is further indicated by using the second information in the level-2 control channel, thereby reducing downlink resource overheads in the level-1 control channel and also reducing information overheads used for resource allocation in the control channels.

With reference to the first aspect, in a first implementation of the first aspect, the receive bandwidth includes at least one first resource element; and the generating first information based on the receive bandwidth includes: determining, by the base station, a size of the first resource element based on the receive bandwidth, where the size of the first resource element includes a size of a first-type RBG; determining, by the base station based on the size of the first resource element, a location of the first resource element occupied within the frequency domain resource range; and generating, by the base station, the first information based on the location of the first resource element and the size of the first resource element. According to the present disclosure, the base station generates the first information by configuring the receive bandwidth of the terminal and the size of the first resource element, divides the receive bandwidth of the terminal into several bandwidth regions, and configures a size of a second resource element of downlink resource elements based on a downlink resource scheduling status, thereby improving flexibility of PDSCH resource allocation.

With reference to the first implementation of the first aspect, in a second implementation of the first aspect, the determining, by the base station, a size of the first resource element based on the receive bandwidth includes: determining the size of the first resource element based on a predefined correspondence between the receive bandwidth and the size of the first resource element.

With reference to the first implementation of the first aspect, in a third implementation of the first aspect, the determining, by the base station, a size of the first resource element based on the receive bandwidth includes: configuring, by the base station, the size of the first resource element in a dynamic or semi-static manner by using radio resource control (RRC) higher layer signaling.

With reference to the first implementation of the first aspect, in a fourth implementation of the first aspect, each of the at least one first resource element includes a plurality of second resource elements, and the first information further includes first configuration information used for configuring a size of the second resource element; and that the second information indicates a location of the downlink data channel within the frequency domain resource range includes: determining, by the base station based on the size of the second resource element, a location of the downlink data channel in the second resource element occupied within the frequency domain resource range. Among the at least one first resource element, a plurality of first resource elements may be of a same size. In other words, sizes of a plurality of first-type RBGs configured by the base station are the same.

With reference to the fourth implementation of the first aspect, in a fifth implementation of the first aspect, the second information includes third indication information; and the third indication information is used to indicate a bitmap of the downlink data channel within the frequency domain resource range, where the bitmap includes at least one bit, and each of the at least one bit indicates one second resource element. According to this aspect, the third indication information helps the terminal determine, based on content indicated by the third indication information, a location of a PDSCH resource in frequency domain, thereby reducing indication information overheads in the level-1 control channel.

With reference to the first aspect, in a sixth implementation of the first aspect, that the first information is used for determining a frequency domain resource range used by a downlink data channel includes: the first information includes first indication information, where the first indication information is used to indicate a bitmap of the frequency domain resource range on the receive bandwidth; and the bitmap on the receive bandwidth includes at least one bit, and each of the at least one bit indicates one first resource element.

With reference to the first aspect, in a seventh implementation of the first aspect, the first information further includes second indication information, and the second indication information is used to indicate configuration information of the level-2 control channel.

With reference to the seventh implementation of the first aspect, in an eighth implementation of the first aspect, the second indication information includes: a quantity of OFDM symbols occupied by the level-2 control channel and a quantity of control channel elements used by the level-2 control channel. The level-2 control channel is mapped onto a downlink time-frequency resource based on a control channel element (CCE) structure. Each CCE includes a fixed quantity of resource elements RE.

With reference to the first aspect or any one of the first to the eighth implementations of the first aspect, in a ninth implementation of the first aspect, the second information further includes second configuration information, and the second configuration information is used to indicate a manner in which a downlink data channel resource scheduled by the base station to the terminal next time is allocated.

According to a second aspect, this application provides a resource receiving method. The method is corresponding to the resource configuration method provided in the first aspect, and includes: receiving, by a terminal, a level-1 control channel and a level-2 control channel that are sent by a base station; demodulating, by the terminal, the level-1 control channel, to obtain first information, where the first information is used for determining a frequency domain resource range used by a downlink data channel; demodulating, by the terminal, the level-2 control channel based on the first information, to obtain second information from the level-2 control channel, where the second information is used to indicate a location of a downlink data resource within the frequency domain resource range; and determining, by the terminal, a location of the downlink data resource in frequency domain based on the second information and the first information.

In this aspect, after receiving the level-1 control channel and the level-2 control channel that are sent by the base station, the terminal first demodulates the level-1 control channel, to obtain the first information, where the first information includes first indication information, second indication information, and first configuration information; and then performs blind detection on the level-2 control channel based on these pieces of information, to obtain the second information, where the second information includes third indication information. The terminal determines the location of the downlink data channel resource in frequency domain based on the third indication information, the first indication information, and the first configuration information. According to this method for jointly indicating a location of a downlink data channel resource by using a level-1 control channel and a level-2 control channel, overheads used when only the level-1 control channel is used to indicate information are reduced.

With reference to the second aspect, in a first implementation of the second aspect, the first information includes second indication information; and the demodulating, by the terminal, the level-2 control channel based on the first information, to obtain second information includes: obtaining, by the terminal based on the second indication information, sizes of resources occupied by the level-2 control channel in time domain and frequency domain; and demodulating the level-2 control channel based on the second indication information, and generating the second information, where the second information includes third indication information, and the third indication information is used to indicate a bitmap of the downlink data channel within the frequency domain resource range.

With reference to the second aspect or the first implementation of the second aspect, in a second implementation of the second aspect, the second information further includes second configuration information, and the second configuration information is used to indicate a manner in which a downlink data channel resource scheduled by the base station to the terminal next time is allocated.

According to a third aspect, this application further provides another resource allocation method. In the method, locations of downlink data channels within a shared frequency domain resource range are indicated for a group of terminals by using a level-1 control channel. The method includes: obtaining, by a base station, receive bandwidth reported by a plurality of terminals; grouping the plurality of terminals based on the receive bandwidth, and configuring a same level-1 control channel for terminals in a same group;

generating, by the base station based on channel state information and receive bandwidth information, first information that is used for determining a frequency domain resource range used by downlink data channels, and generating second information based on the first information and the channel state information, where the second information is used to indicate a location of a downlink data resource within the frequency domain resource range; and sending, by the base station, the level-1 control channel to the terminals in the group, and sending a level-2 control channel to each terminal in the same group, where the level-1 control channel includes the first information, and the level-2 control channel includes the second information.

According to the method provided in this aspect, the base station groups the plurality of terminals, and further when configuring a resource location in frequency domain for each terminal, uses the same level-1 control channel to indicate, simultaneously for a group of terminals, for example, for a plurality of UEs, a location of a bandwidth region set in which a PDSCH resource is located, thereby preventing the base station from generating the first information in the level-1 control channel for each terminal, and further reducing overheads of the level-1 control channel.

In addition, compared with a downlink resource allocation method in LTE, the method provided in this aspect has the following improvement: PDSCH resource allocation information is no longer terminal-UE-specific, and some of resource allocation information may simultaneously indicate frequency domain location regions in which PDSCHs of a plurality of terminal UEs are located. Therefore, overheads of resource allocation information are further reduced.

With reference to the third aspect, in a first implementation of the third aspect, each piece of second information includes third indication information, where a quantity of third indication information pieces is the same as a quantity of terminals in a group obtained through division; and each piece of third indication information is a bitmap indicating a frequency domain resource occupied by a downlink data channel resource within the frequency domain resource range, where the bitmap includes several bits, and each bit may be corresponding to one second resource allocation unit.

According to a fourth aspect, this application further provides a resource receiving method, corresponding to the resource allocation method provided in the third aspect. The resource receiving method is used for receiving a downlink resource sent by a base station to terminals in a same group. Specific method steps include:

receiving, by a terminal, a same level-1 control channel and a level-2 control channel that is corresponding to each of terminals in a group, where the same level-1 control channel and the level-2 control channel are sent by a base station; demodulating, by the terminal, the level-1 control channel, to obtain first indication information and first configuration information in first information from the level-1 control channel; demodulating, by each terminal, the level-2 control channel based on the first information, to obtain third indication information from the level-2 control channel; and determining, by each terminal, a location of a downlink data channel resource in frequency domain based on the third indication information, the first indication information, and the first configuration information.

With reference to the fourth aspect, in a first implementation of the fourth aspect, the method further includes: demodulating, by the terminal, the level-1 control channel, to obtain second indication information in the first information from the level-1 control channel; and demodulating the level-2 control channel based on the second indication information.

According to a fifth aspect, this application further provides a base station, applied to a two-level control channel structure that includes a level-1 control channel and a level-2 control channel. The base station includes a transceiver and a processor; the transceiver is configured to obtain receive bandwidth of a terminal; the processor is configured to: generate first information based on the receive bandwidth, where the first information is used for determining a frequency domain resource range used by a downlink data channel; and generate second information based on the first information, where the second information is used to indicate a location of the downlink data channel within the frequency domain resource range; and the transceiver is further configured to: send the first information to the terminal through the level-1 control channel, and send the second information to the terminal through the level-2 control channel.

In addition, according to the base station provided in this aspect, the processor and the transceiver in the base station are further configured to implement any technical solution in the first to the ninth implementations of the first aspect.

According to a sixth aspect, this application further provides a terminal, corresponding to the base station provided in the fifth aspect. The terminal includes a transceiver and a processor; the transceiver is configured to receive a level-1 control channel and a level-2 control channel that are sent by a base station; the processor is configured to demodulate the level-1 control channel, to obtain first information, where the first information is used for determining a frequency domain resource range used by a downlink data channel; the processor is further configured to demodulate the level-2 control channel based on the first information, to obtain second information from the level-2 control channel, where the second information is used to indicate a location of a downlink data resource within the frequency domain resource range; and the processor is further configured to determine a location of the downlink data resource in frequency domain based on the second information and the first information.

In addition, according to the terminal provided in this aspect, the processor and the transceiver in the terminal are further configured to implement the technical solution in the first or the second implementation of the second aspect.

According to a seventh aspect, this application further provides a resource configuration system. The system includes a base station and a terminal, and is applied to a two-level control channel structure that includes a level-1 control channel and a level-2 control channel.

The base station is configured to: obtain receive bandwidth of the terminal; generate first information based on the receive bandwidth, where the first information is used for determining a frequency domain resource range used by a downlink data channel; generate second information based on the first information, where the second information is used to indicate a location of the downlink data channel within the frequency domain resource range; and send the first information to the terminal through the level-1 control channel, and send the second information to the terminal through the level-2 control channel.

The terminal is configured to: receive a level-1 control channel and a level-2 control channel that are sent by the base station; demodulate the level-1 control channel, to obtain first information, where the first information is used for determining a frequency domain resource range used by a downlink data channel; demodulate the level-2 control channel based on the first information, to obtain second information from the level-2 control channel, where the second information is used to indicate a location of a downlink data resource within the frequency domain resource range; and determine a location of the downlink data resource in frequency domain based on the second information and the first information.

The base station is further configured to implement the technical solutions in the fifth aspect and each implementation of the fifth aspect in this application. The terminal is further configured to implement the technical solutions in the sixth aspect and each implementation of the sixth aspect in this application.

According to an eighth aspect, this application further provides another resource configuration system. The system includes a base station and at least one terminal.

The base station is configured to: obtain receive bandwidth reported by a plurality of terminals, group the plurality of terminals based on the receive bandwidth, and configure a same level-1 control channel for terminals in a same group.

The base station is further configured to: generate, based on channel state information and receive bandwidth information, first information that is used for determining a frequency domain resource range used by downlink data channels; and generate second information based on the first information and the channel state information, where the second information is used to indicate a location of a downlink data resource within the frequency domain resource range.

The base station is further configured to: send the level-1 control channel to the terminals in the group, and send a level-2 control channel to each terminal in the same group, where the level-1 control channel includes the first information, and the level-2 control channel includes the second information.

Each terminal is configured to: receive the same level-1 control channel and a level-2 control channel that is corresponding to the terminal, where the same level-1 control channel and the level-2 control channel are sent by the base station; and demodulate the level-1 control channel, to obtain first indication information and first configuration information in the first information from the level-1 control channel.

Each terminal is further configured to: demodulate the level-2 control channel based on the first information, to obtain third indication information from the level-2 control channel; and determine a location of a downlink data channel resource in frequency domain based on the third indication information, the first indication information, and the first configuration information.

In addition, each terminal is further configured to: demodulate the level-1 control channel, to obtain second indication information in the first information from the level-1 control channel, and demodulate the level-2 control channel based on the second indication information.

According to a ninth aspect, a computer storage medium is further provided. The computer storage medium may store a program. When the program is executed, some or all of steps in each implementation of a resource configuration method and a resource receiving method provided in the present disclosure may be included.

BRIEF DESCRIPTION OF DRAWINGS

To describe the technical solutions in the embodiments of this application more clearly, the following briefly describes the accompanying drawings required for describing the embodiments. Apparently, a person of ordinary skill in the art may derive other drawings from these accompanying drawings without creative efforts.

DESCRIPTION OF EMBODIMENTS

Embodiments of this application may be applied to various communications systems, for example, an LTE system, or other wireless communications systems that use various wireless access technologies, for example, systems that use access technologies such as code division multiple access, frequency division multiple access, time division multiple access, orthogonal frequency division multiple access, and single carrier frequency division multiple access, and a subsequent evolved system, for example, a fifth generation 5G system.

The embodiments of this application may be applied to a wireless communications system that includes a network device and a terminal device (terminal device or terminal equipment). Specifically, the embodiments of the present disclosure may be applied to data transmission between the terminal device and the network device.

The terminal device may be a device that provides a user with voice and/or data connectivity, a handheld device with a wireless connection function, or another processing device connected to a wireless modem. A wireless terminal may communicate with one or more core networks through a radio access network (RAN). The wireless terminal may be a mobile terminal, such as a mobile phone (also referred to as a "cellular" phone) or a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communications service (PCS) phone, a cordless telephone, a Session Initiation Protocol (SIP) phone, a wireless local loop (WLL) station, or a personal digital assistant (PDA). The wireless terminal may be also referred to as a system, a subscriber unit (SU), a subscriber station (SS), a mobile station (MS), a remote station (RS), an access point (AP), a remote terminal (RT), an access terminal (AT), a user terminal (UT), a user agent (UA), a user device, or user equipment (UE).

The network device may be a base station, an enhanced base station, a relay having a scheduling function, a device having a base station function, or the like. The base station may be an evolved NodeB (eNB) in an LTE system, or a base station in another system. This is not limited in the embodiments of the present disclosure.

In the LTE system, a basic unit in frequency domain is a subcarrier, and a subcarrier spacing is 15 kHz. At an LTE physical layer, downlink system bandwidth is represented by $N_{RB}^{DL}$ and expressed in number of resource blocks (RB). Each RB includes 12 contiguous subcarriers in frequency domain and six or seven consecutive OFDM symbols in time domain.

Figure 1:
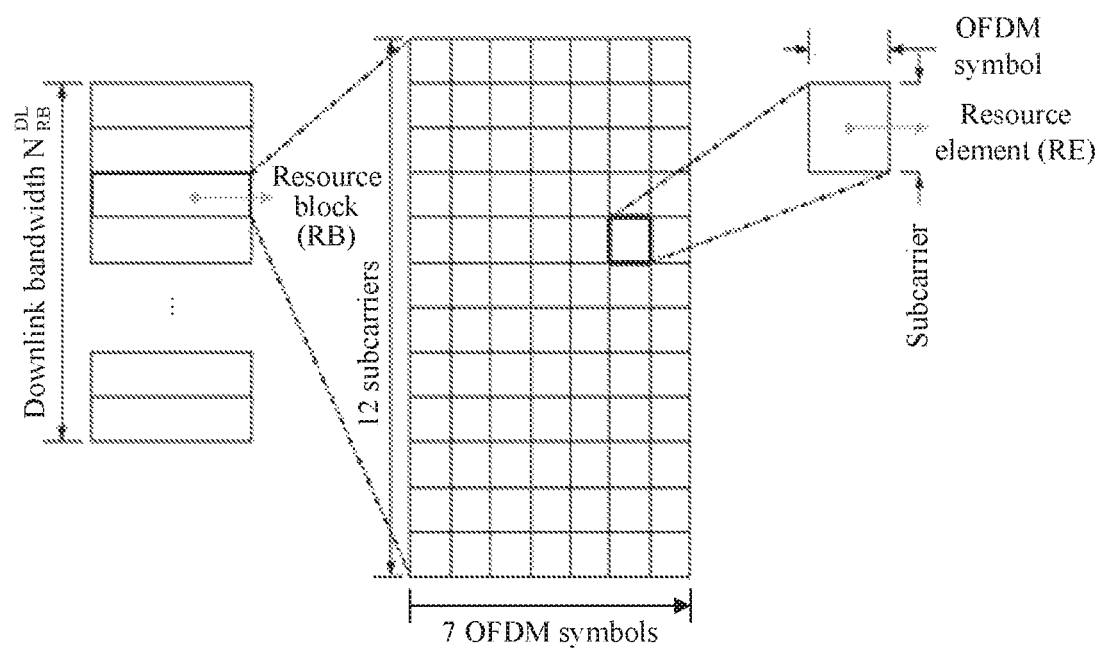
FIG. 1 is a schematic diagram of a downlink time-frequency resource grid according to an embodiment of this application.

FIG. 1 is a schematic diagram of a downlink time-frequency resource grid. Each element in the resource grid is referred to as a resource element (RE). The RE is a smallest physical resource, and includes one subcarrier within one OFDM symbol. A basic time unit of downlink resource scheduling in LTE is one downlink subframe. Scheduling within one downlink subframe involves two RBs that are consecutive in time. A downlink subframe is divided into a control region and a data region. A physical downlink shared channel (PDSCH) is transmitted in a data region of a downlink subframe, and is a downlink channel in LTE that bears major data transmission. An LTE time-frequency resource used by the PDSCH also includes an RB. To receive the PDSCH correctly, a terminal device needs to first demodulate a physical downlink control channel (PDCCH). The PDCCH is transmitted in a control region of the downlink subframe. Downlink control information (DCI) carried by the PDCCH contains information that can indicate a location of an RB used by the PDSCH in frequency domain, that is, downlink resource allocation information.

In an LTE system, a base station usually uses three resource allocation types. The three resource allocation types are type 0, type 1, and type 2. The base station determines, based on a selected PDCCH DCI format and a configuration of a related bit in DCI, a resource allocation type used by a PDSCH. A specific configuration process is as follows.

Resource allocation type 0: In resource allocation type 0, the base station uses a bitmap (bitmap) in DCI in a PDCCH to indicate a location of a resource block group (RBG) allocated to a PDSCH. The RBG is a group of RBs that are contiguous in frequency domain. In other words, each RBG includes a same quantity of RBs. An RBG size is related to downlink system bandwidth $N_{RB}^{DL}$. A relationship is shown in the following Table 1.

TABLE 1

Relationship between the RBG size and the system bandwidth

| System bandwidth | RBG size |
| --- | --- |
| $N_{RB}^{DL}$ | P |
| ≤10 | 1 |
| 11-26 | 2 |
| 27-63 | 3 |
| 64-110 | 4 |

For the system bandwidth $N_{RB}^{DL}$, the RBG size corresponding to the system bandwidth is P, and a total quantity of resource overheads occupied by the system bandwidth may be expressed in $\lceil N_{RB}^{DL}/P \rceil$. Then, a corresponding bitmap totally includes $\lceil N_{RB}^{DL}/P \rceil$ bits. Each bit is corresponding to one RBG, a most significant bit represents RBG 0, and a least significant bit represents RBG $\lceil N_{RB}^{DL}/P \rceil - 1$. If an RBG is allocated to a PDSCH, a corresponding bit in the bitmap is set to 1; otherwise, a corresponding bit in the bitmap is set to 0.

Figure 2:
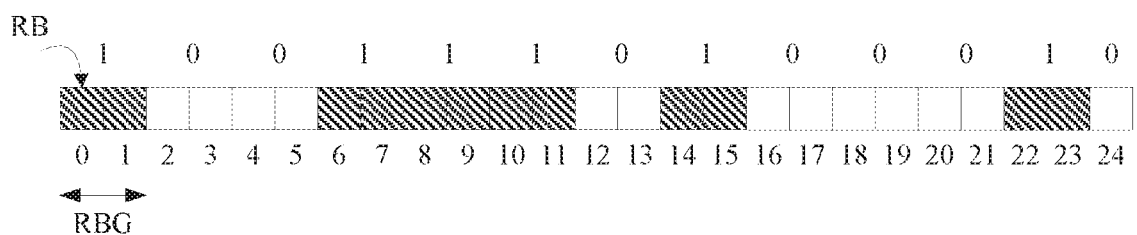
FIG. 2 is a schematic diagram of a two-level control channel structure in a new air interface according to an embodiment of this application.

For example, when the system bandwidth $N_{RB}^{DL}$ is 25 RBs, it can be learned from the foregoing table that the RBG size P corresponding to the system bandwidth is 2. Then, the bitmap totally includes $\lceil N_{RB}^{DL}/P \rceil = \lceil 25/2 \rceil = 13$ bits. Each bit represents two RBs, corresponding to one RBG, that are contiguous in frequency domain. It is assumed that a bitmap code of resources allocated to a PDSCH is "1001110100010", as shown in FIG. 2. Then, RBGs at locations 0, 3, 4, 5, 7, and 11 are allocated to the PDSCH.

Resource allocation type 1: In resource allocation type 1, all RBGs of system bandwidth are divided into P subsets. P is an RBG size. Each RBG subset p (0≤p<P) includes all RBGs that start from an RBG numbered p and whose numbers are at an interval of P. RB resources allocated to a PDSCH must be of a same RBG subset. A value of the RBG subset p may be set by using DCI in a PDCCH. The DCI in the PDCCH indicates, by using a bitmap, locations of the RB resources allocated to the PDSCH. Each bit in the bitmap is corresponding to one RB in an RBG subset.

Resource allocation type 2: In resource allocation type 2, resources allocated to a PDSCH are RBs that are contiguous in frequency domain. In DCI in a PDCCH resource, resource allocation information includes a starting RB allocation position and a length of continuously allocated RBs.

For the foregoing three resource allocation types: For resource allocation type 0, because a resource scheduling granularity is relatively large, a minimum unit of resource scheduling is an RBG, each RBG includes a plurality of RBs, and for relatively large system bandwidth, a time-frequency resource cannot be allocated on a per RB basis, a resource waste may be resulted when a system load is relatively low; for resource allocation type 1, because each resource allocation cannot cover all RBs of system bandwidth, and a quantity and locations of schedulable RBs are restricted, resource allocation type 1 is not suitable for a case in which PDSCH bandwidth is relatively large; and for resource allocation type 2, because resources that need to be allocated to a PDSCH are RBs that are contiguous in frequency domain, only allocation of RBs that are contiguous in frequency domain is supported, and arbitrary RB allocation is not supported.

Among the foregoing resource allocation types of the LTE system, resource allocation types 0, 1, and 2 are all restricted by some conditions. For example, UE bandwidth value is restricted by a system bandwidth value. When bandwidth of UE is less than the system bandwidth, if a PDSCH resource to be received by the UE is still scheduled based on the RBG size that is related to the system bandwidth, flexibility of UE resource scheduling is restricted, and frequency selection performance is affected.

Figure 3:
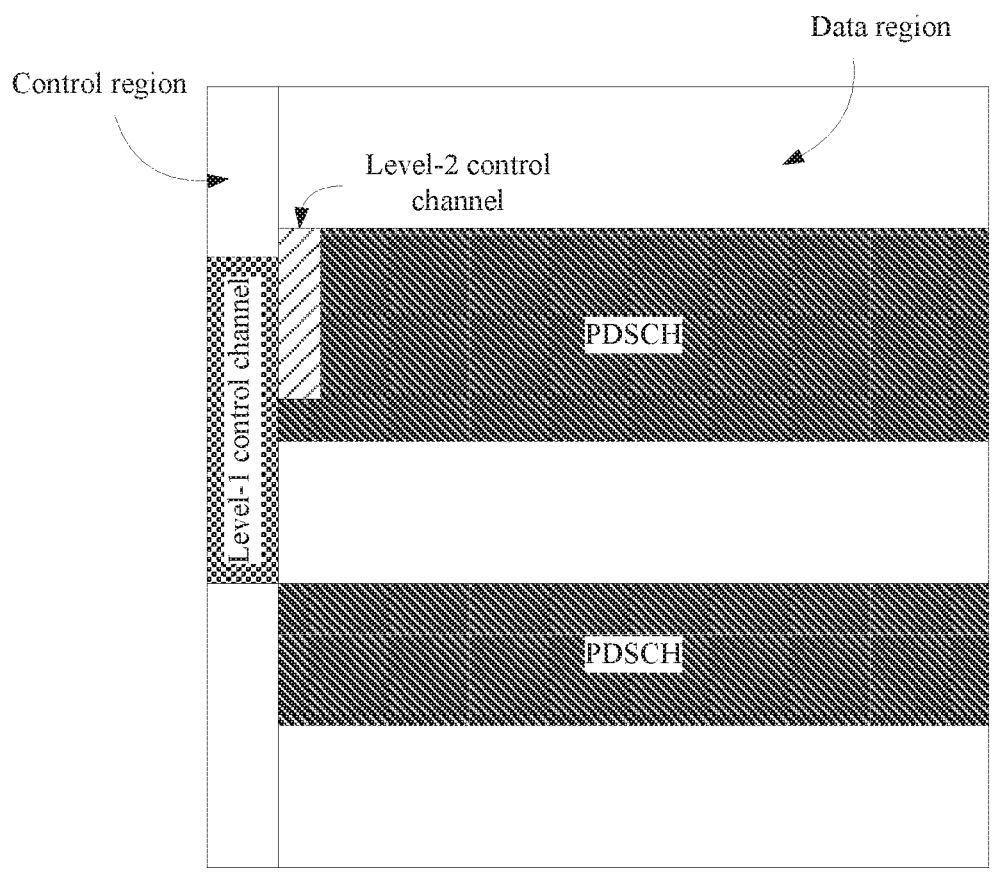
FIG. 3 is a schematic configuration diagram of a resource allocation type according to an embodiment of this application.

Therefore, to improve flexibility of PDSCH resource scheduling, a two-level downlink control channel structure is introduced in the embodiments of this application. A specific structure is shown in FIG. 3. The channel structure includes a level-1 control channel and a level-2 control channel. The level-1 control channel is located in a control region of a subframe, and the level-2 control channel is located in a data region of the subframe. Further, DCI carried by the level-1 control channel may be used to indicate resource allocation information of a PDSCH. A time-frequency resource of the level-2 control channel is mapped onto a resource to which the PDSCH belongs, and transmitted to a terminal along with the PDSCH. The level-2 control channel also includes DCI that is used to carry some other control information. For example, the DCI includes related information such as a modulation and coding scheme, initial transmission, or retransmission.

If a downlink resource is allocated by using the control channels of two levels, the level-1 control channel is carried by a downlink control channel, and available time-frequency resources are relatively scarce, whereas the level-2 control channel is carried by a downlink data channel, and available time-frequency resources are relatively sufficient. Generally, if only the level-1 control channel is used to indicate resource allocation information, information indication overheads that need to be used are relatively large, and a capacity of the level-1 control channel is affected. Therefore, on a premise that the control channels of two levels are used, overheads of downlink resource allocation information in the level-1 control channel are reduced, and flexibility of PDSCH resource scheduling is improved.

Figure 4:
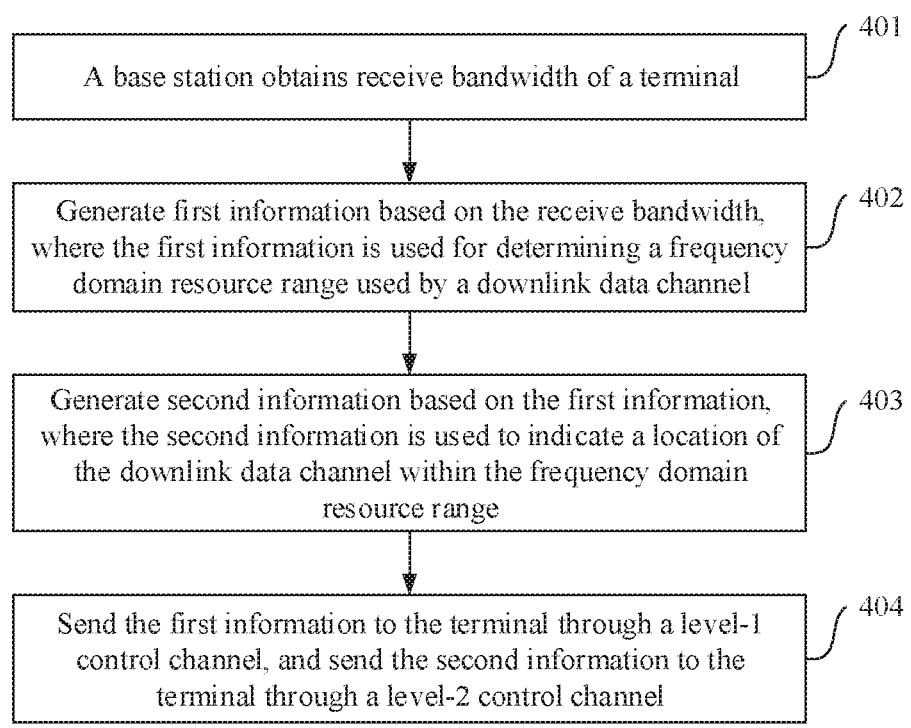
FIG. 4 is a schematic flowchart of a resource configuration method according to an embodiment of this application.

As shown in FIG. 4, an embodiment of this application provides a resource configuration method, applied to a two-level control channel structure that includes a level-1 control channel and a level-2 control channel. The method includes the following steps.

Step 401: A base station obtains receive bandwidth of a terminal. Optionally, the base station also receives channel state information (CSI) of the terminal.

Step 402: The base station generates first information based on the receive bandwidth, where the first information is used for determining a frequency domain resource range used by a downlink data channel.

Specifically, the receive bandwidth includes at least one first resource element. A bandwidth size of each first resource allocation unit is corresponding to a subband within the receive bandwidth. The base station evenly divides the receive bandwidth into several subbands based on the size of the first resource allocation unit. Optionally, the first resource element may be a first-type RBG. In step 402, on a side of the base station, a size of the first-type RBG may be set to $P_1$ based on a predefined or semi-statically configured size of the first-type RBG. Optionally, during configuration, the base station may correlate a value of the size $P_1$ of the first-type RBG to receive bandwidth $N_{RB}^{UE}$ of UE, and pre-define a correspondence between the value of the size $P_1$ of the first-type RBG and the receive bandwidth $N_{RB}^{UE}$ of the UE. The following Table 2 shows a possible correspondence between the size of the first-type RBG and the receive bandwidth of the UE.

TABLE 2

Correspondence between the size of the first-type RBG and the receive bandwidth of the UE

| Receive bandwidth of UE | Size of a first-type RBG |
|---|---|
| $N_{RB}^{DL}$ | $P_1$ |
| ≤16 | 2 |
| 17-64 | 4 |
| 65-128 | 8 |
| 129-256 | 16 |

After the UE accesses an LTE system, the UE reports a receive bandwidth capability of the UE to the base station, and the base station determines a value of $P_1$ based on a correspondence between the receive bandwidth capability of the UE and the size of the first-type RBG.

After obtaining the channel state information and the receive bandwidth of the terminal, the base station determines the size of the first resource allocation unit and a location of a frequency domain resource of the downlink data channel configured to the terminal, and determines the first information based on the size of the first resource allocation unit and the location of the frequency domain resource of the downlink data channel configured to the terminal.

Further, the first information includes first indication information, second indication information, and first configuration information. The first indication information is used to indicate a bitmap of the frequency domain resource range on the receive bandwidth. The bitmap includes at least one bit, and each of the at least one bit indicates one first resource element. The second information indicates the location of the downlink data channel within the frequency domain resource range. The first configuration information is used for configuring a size of a second resource element. After generating the first information, the base station adds the first information to DCI in the level-1 control channel.

Step 403: The base station generates second information based on the first information, where the second information is used to indicate a location of the downlink data channel within the frequency domain resource range, and the base station adds the generated second information to DCI in the level-2 control channel.

Step 404: The base station sends the first information to the terminal through the level-1 control channel, and sends the second information to the terminal through the level-2 control channel.

Optionally, the base station first sends the level-1 control channel that carries the first information to the terminal, then sends the level-2 control channel that carries the second information to the terminal, and also sends a downlink data resource to the terminal.

Optionally, in step 402, that the base station determines the size of the first resource element based on the receive bandwidth includes:

In a specific embodiment, a process in which the base station generates the first information includes:

The base station configures the first-type RBG based on information such as the received receive bandwidth of the terminal and the CSI. The base station divides operating receive bandwidth $N_{RB}^{UE}$ of the UE into $\lceil N_{RB}^{UE}/P_1 \rceil$ bandwidth regions based on the size of the first-type RBG. A size of each bandwidth region in frequency domain is $P_1$ RBs that are contiguous in frequency domain, where $P_1$ is the size of the first-type RBG. The base station indicates, in the DCI in the level-1 control channel and by using the first indication information, a location, on the receive bandwidth of the UE, of a bandwidth region set in which a PDSCH resource allocated to the UE is located. Specifically, if the first indication information is bitmap information, a bitmap totally includes $\lceil N_{RB}^{UE}/P_1 \rceil$ bits. Each bit is corresponding to one first-type RBG, a most significant bit represents first-type RBG 0, and a least significant bit represents first-type RBG $\lceil N_{RB}^{UE}/P_1 \rceil-1$. If an RB in a first-type RBG is allocated as a PDSCH resource of UE, a corresponding bit in the bitmap is set to 1; otherwise, a corresponding bit in the bitmap is set to 0.

Figure 5:
FIG. 5 is a schematic diagram of a bandwidth region in which a PDSCH resource is located according to an embodiment of this application.

For example, receive bandwidth $N_{RB}^{UE}$ of UE is 192. If a relationship between the receive bandwidth of the UE and a size of a first-type RBG is shown in the foregoing table, a size $P_1$ of each first-type RBG is 16. A total quantity of RBGs is $\lceil N_{RB}^{UE}/P_1 \rceil = \lceil 192/16 \rceil = 12$. In other words, the bitmap totally includes 12 bits. If a bitmap in the DCI in the level-1 control channel is "001110111000", PDSCH resources allocated to the UE are located in a bandwidth region set that includes first-type RBGs 2, 3, 4, 6, 7, and 8, as shown in FIG. 5.

The first information generated by the base station includes the second indication information. The second indication information may be information required by the first information for indicating a size of a time-frequency resource of the level-2 control channel, and specifically includes the following information bits:

a quantity of OFDM symbols occupied by the level-2 control channel: 1 or 2 bits, for example, as shown in the following Table 3.

TABLE 3

Table of a correspondence between OFDM symbol information and a quantity of OFDM symbols

| Bit value | 00 | 01 | 10 | 11 |
|---|---|---|---|---|
| Quantity of OFDM symbols | 1 | 2 | 3 | 4 |

The second indication information further includes a quantity of control channel elements (CCE) used by the level-2 control channel, for example, 2 bits. The level-2 control channel is mapped onto a downlink time-frequency resource based on a CCE structure. Each CCE includes a fixed quantity of REs, for example, including 36 REs, for example, as shown in Table 4.

TABLE 4

Table of a correspondence between CCE information and a quantity of CCEs

| Bit value | 00 | 01 | 10 | 11 |
|---|---|---|---|---|
| Quantity of CCEs | 1 | 2 | 4 | 8 |

Further, the first information includes the first configuration information. The first configuration information is used as a 2-bit information field in the level-1 control channel. The information field is used for configuring a size $P_2$ of a second-type RBG, for example, as shown in Table 5.

TABLE 5

Table of a correspondence between the first configuration information and the size of the second-type RBG

| Bit value | 00 | 01 | 10 | 11 |
|---|---|---|---|---|
| $P_2$ | 1 | 2 | 4 | 8 |

Figure 6:
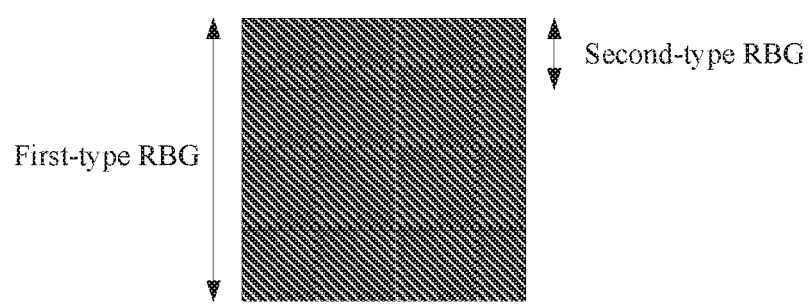
FIG. 6 is a schematic diagram of a relationship, configured by a base station, between a first-type RBG and a second-type RBG according to an embodiment of this application.

Optionally, the base station flexibly configures a value of the size $P_2$ of the second-type RBG, that is, $P_2$ PRBs that are contiguous in frequency domain, based on a bandwidth size of the PDSCH resource scheduled to the UE. In addition, in a same PDSCH resource scheduling process, the size of the second-type RBG should be less than the size of the first-type RBG, that is, $P_2 < P_1$. Moreover, optionally, the configured value of $P_2$ meets a relationship $P_1 = N*P_2$, where N is an integer greater than 1. In other words, one first-type RBG includes a plurality of second-type RBGs. As shown in FIG. 6, one first-type RBG includes four second-type RBGs.

The base station allocates, in the bandwidth region set in which the PDSCH resource is located, the PDSCH resource by using the second-type RBG as a resource allocation unit.

The base station sends, to the terminal, the generated level-1 control channel, the generated level-2 control channel, and the location of the frequency domain resource of the downlink data channel configured to the terminal. The terminal receives and demodulates the level-1 control channel, and obtains the first information in the level-1 control channel, or obtains the first indication information, the second indication information, and the first configuration information in the DCI in the level-1 control channel. Then, the terminal performs blind detection on the level-2 control channel based on the obtained information.

The UE obtains, based on the second indication information in the DCI in the level-1 control channel, sizes of resources occupied by the level-2 control channel in time domain and in frequency domain, and further obtains a DMRS sequence value used for demodulating the level-2 control channel. In addition, the UE determines, based on a location of a first bit that is set to 1 and that is in the bitmap in the DCI in the level-1 control channel, a bandwidth region in which a starting resource mapping position of the level-2 control channel is located, and obtains a value of a size of a resource allocation unit of the bandwidth region based on the first configuration information, that is, the value of the size $P_2$ of the second-type RBG. One bandwidth region includes $\lceil P_1/P_2 \rceil$ second-type RBGs, and the level-2 control channel may perform starting-position mapping on each of these second-type RBGs. Therefore, the UE demodulates the level-2 control channel at locations of the $\lceil P_1/P_2 \rceil$ second-type RBGs by using a DMRS sequence. That is, a maximum quantity of blind detection operations performed by the UE on the level-2 control channel is $\lceil P_1/P_2 \rceil$.

Figure 7:
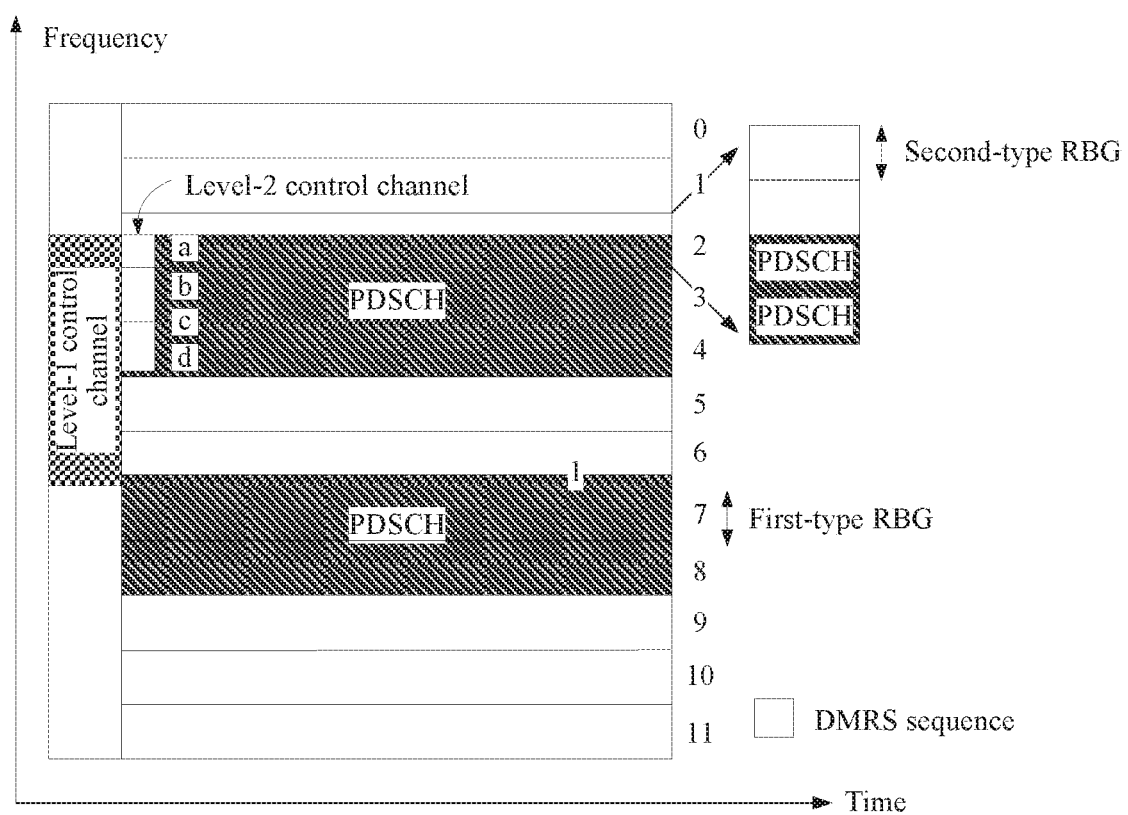
FIG. 7 is a schematic diagram of PDSCH resource allocation through joint indication by using control channels of two levels according to an embodiment of this application.

For example, the size $P_2$ of the second-type RBG is set to 4, and a corresponding DMRS sequence used for demodulating the level-2 control channel is "abcd". As shown in FIG. 7, a horizontal coordinate represents time domain, and a longitudinal axis represents frequency domain. If the bitmap in the DCI in the level-1 control channel is "001110111000", a first bit coded 1 in the bitmap is in a third bit in the bitmap. In this case, the bandwidth region in which the starting resource mapping position of the level-2 control channel is located is first-type RBG 2. First-type RBG 2 has $\lceil P_1/P_2 \rceil = 4$ second-type RBGs. Therefore, the UE needs to demodulate the level-2 control channel at locations of the four candidate second-type RBGs by using the DMRS sequence "abcd".

This embodiment of this application provides the method for allocating a PDSCH resource through joint indication by using control channels of two levels. According to the method, a downlink resource allocation unit, that is, the size of the second-type RBG, can be configured based on a downlink resource scheduling status, thereby improving flexibility of PDSCH resource allocation; and bandwidth regions are obtained through division based on the level-1 control channel, and the level-2 control channel further indicates a resource allocation location within a bandwidth region set, thereby reducing indication information overheads in the level-1 control channel and also reducing information indication overheads used for resource allocation in the control channels.

Specifically, if the level-1 control channel is used to indicate PDSCH resource allocation information, for example, the method described in resource allocation type 0 is used, for example, the RBG size P is 4, bitmap information includes $\lceil N_{RB}^{DL}/P \rceil = 48$ bits. The bitmap information is equivalent to the resource allocation information. The 48 bits are overheads used by the level-1 control channel in the LTE system for the resource allocation information. In other words, the overheads are 48 bits.

According to the resource configuration method provided in this application, if the size $P_1$ of each first-type RBG is 16, the bitmap totally includes $\lceil NN_{RB}^{UE}/P_1 \rceil=12$ bits. The bitmap information is resource allocation information in the level-1 control channel, that is, the generated first information. The first information includes the first indication information. The 12 bits are overheads used by the level-1 control channel for the resource allocation information. In other words, the overheads are 12 bits. If locations of frequency domain resources of a PDSCH are shown in the figure, the bitmap information in the DCI in the level-1 control channel is "001110111000". The configured size $P_2$ of the second-type RBG is set to 4. The UE obtains a value of $P_2$ from the 2-bit first configuration information. When the bitmap in the DCI in the level-1 control channel is "001110111000", it can be learned from the foregoing step 401 that there are totally L=6 bits coded "1". In other words, the frequency domain resources of the PDSCH are in bandwidth regions of first-type RBGs 2, 3, 4, 6, 7, and 8. In this case, a bitmap in the level-2 control channel includes $\lceil LP_1/P_2 \rceil=24$ bits. Bitmap information is resource allocation information in the level-2 control channel, that is, third indication information. The 24 bits are overheads used by the level-2 control channel for the resource allocation information. Therefore, when the method provided in this embodiment of this application is used, required channel overheads are: the overheads of the level-1 control channel (that is, the first indication information): 12 bits; overheads of the first configuration information: 2 bits; and overheads of the third indication information: 24 bits. Total overheads of the three are 38 bits.

According to the method for jointly indicating a PDSCH resource location by using control channels of two levels in this embodiment of this application, the total overheads occupying the control channels are 38 bits, and are less than 48 bits used when only the level-1 control channel is used to indicate PDSCH resource allocation information, thereby effectively reducing information indication overheads used by the control channel for resource allocation.

In addition, the method provided in this application further includes the following beneficial effects:

First: The size of the resource allocation unit RBG is no longer related to the system bandwidth, and may be flexibly configured based on the receive bandwidth of the UE or the downlink resource scheduling status.

Second: The resource allocation information, that is, the first indication information, is no longer indicated by a single control channel through configuration, and is jointly indicated by using two control channels, to reduce overheads used when only the level-1 control channel is used to indicate information.

Corresponding to the resource configuration method provided in the foregoing embodiment, this embodiment further provides a resource receiving method, applied to a terminal device. The method includes the following steps.

Step 801: A terminal receives a level-1 control channel and a level-2 control channel that are sent by a base station.

Step 802: The terminal demodulates the level-1 control channel, to obtain first information, where the first information is used for determining a frequency domain resource range used by a downlink data channel, and the first information includes first indication information, second indication information, and first configuration information.

Step 803: The terminal demodulates the level-2 control channel based on the first information, to obtain second information from the level-2 control channel, where the second information is used to indicate a location of a downlink data resource within the frequency domain resource range.

Step 804: The terminal determines a location of the downlink data resource in frequency domain based on the second information and the first information.

Optionally, the first information includes the second indication information, and that the terminal demodulates the level-2 control channel based on the first information, to obtain second information includes: obtaining, by the terminal based on the second indication information, sizes of resources occupied by the level-2 control channel in time domain and frequency domain; and demodulating the level-2 control channel based on the second indication information, and generating the second information, where the second information includes third indication information, and the third indication information is used to indicate a bitmap of the downlink data channel within the frequency domain resource range.

Specifically, after receiving and demodulating the level-2 control channel, the terminal, for example, UE, obtains the third indication information in the second information in the level-2 control channel, and obtains PDSCH resource allocation information based on the first indication information and the first configuration information in the first information.

The UE determines, based on a location of a bit that is coded "1" and that is in a bitmap in DCI in the level-1 control channel, a location of a bandwidth region set, on receive bandwidth of the UE, in which a PDSCH resource is located. Each bandwidth region has $\lceil P_1/P_2 \rceil$ second-type RBGs. If the bitmap in the DCI in the level-1 control channel totally has L bits coded "1", the bandwidth region set totally has $\lceil LP_1/P_2 \rceil$ second-type RBGs. In this case, a bitmap in DCI in the level-2 control channel totally includes $\lceil LP_1/P_2 \rceil$ bits. Each bit is corresponding to one second-type RBG, a most significant bit represents second-type RBG 0, and a least significant bit represents RBG $\lceil LP_1/P_2 \rceil-1$. If a second-type RBG in the bandwidth region set is allocated as a PDSCH resource of UE, a corresponding bit in the bitmap in the DCI in the level-2 control channel is set to 1; otherwise, a corresponding bit in the bitmap in the DCI in the level-2 control channel is set to 0. Therefore, the UE determines a location of the PDSCH resource in frequency domain based on the location of the bandwidth region set, on the receive bandwidth of the UE, in which the PDSCH resource is located, and based on a location of the PDSCH resource in the bandwidth region set.

In a specific embodiment, as shown in FIG. 7, when the bitmap in the DCI (that is, the first indication information) in the level-1 control channel is "001110111000", there are totally L=6 bits coded "1". Because each first-type RBG represents one bandwidth region, first-type RBGs 2, 3, 4, 6, 7, and 8 form the bandwidth region set. The bitmap in the DCI in the level-2 control channel includes $\lceil LP_1/P_2 \rceil=24$ bits. Therefore, there are totally 24 second-type RBGs in the bandwidth region set. When the bitmap in the DCI in the level-2 control channel is "001111111111000111111111", PDSCH resources allocated to the UE are second-type RBGs 2-11 and 15-23.

Optionally, the second information further includes second configuration information, and the second configuration information is used to indicate a manner in which a downlink data channel resource scheduled by the base station to the terminal next time is allocated.

Specifically, if the second configuration information is a 1-bit information field, the terminal obtains, based on an indication of the information field, a manner in which a PDSCH resource scheduled by the base station to the UE next time is allocated.

When a bit value of the information field is set to "0", correspondingly, a PDSCH resource is allocated to the UE through the level-1 control channel. Optionally, in this allocation manner, resource allocation methods of resource allocation type 0, type 1, and type 2 in an LTE system may be used in the level-1 control channel.

When a bit value of the information field is set to "1", a PDSCH resource is allocated to the UE through joint indication by using control channels of two levels. Resource allocation methods are method procedures of step 401 to step 404 and step 801 to step 804 in the foregoing embodiments.

In addition, the base station may alternatively set the value of the information bit based on a status of next PDSCH resource scheduling. Before next PDSCH resource scheduling is configured for the terminal, a current PDSCH resource allocation manner may be predefined or may be set by using a higher layer signaling indication.

Figure 9:
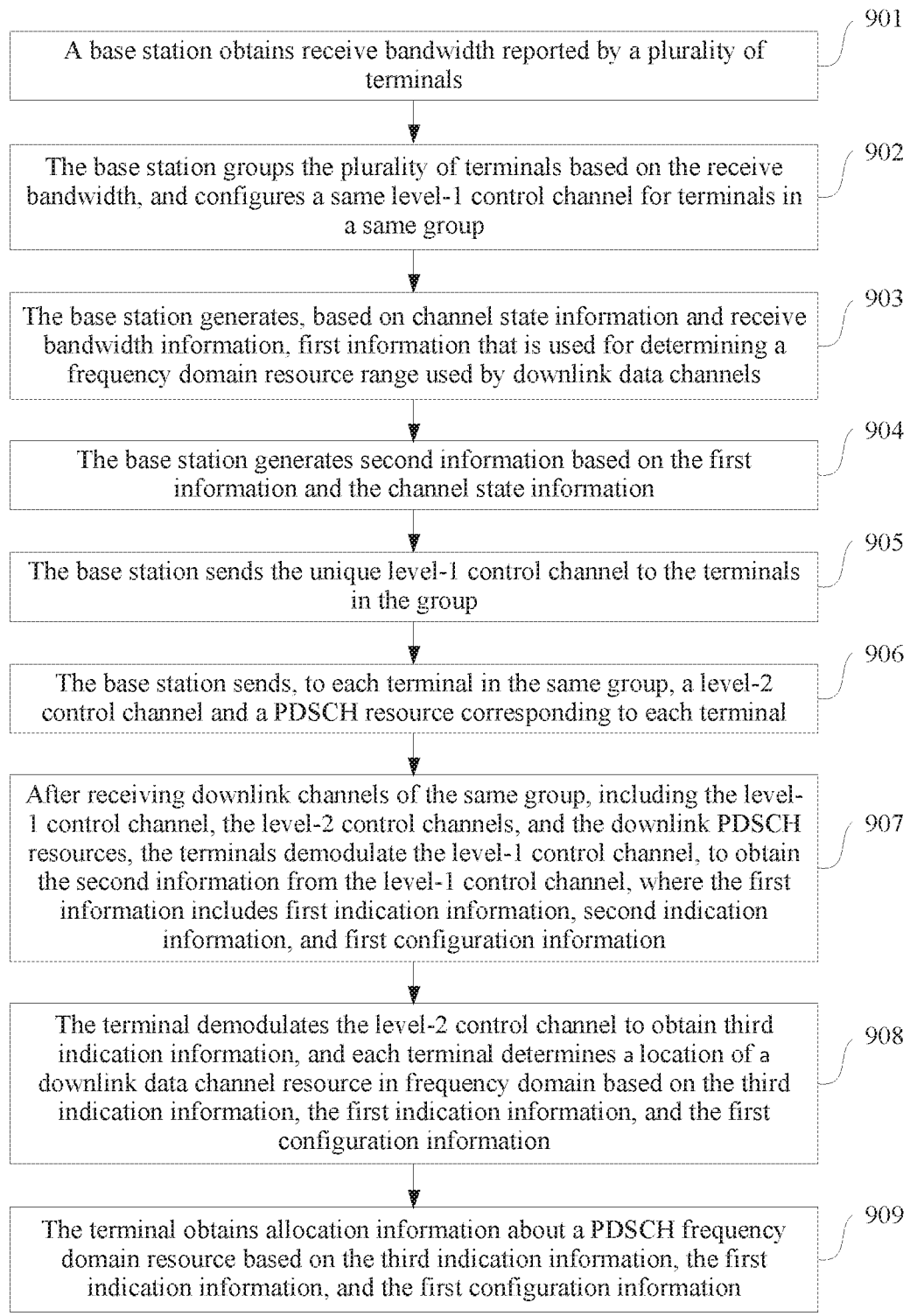
FIG. 9 is a schematic flowchart of another resource configuration method according to an embodiment of this application.

In another embodiment of this application, a resource configuration method is further provided. In the method, locations of downlink data channels within a shared frequency domain resource range are indicated for a group of terminals by using a level-1 control channel. As shown in FIG. 9, the method includes the following steps.

Step 901: A base station obtains receive bandwidth reported by a plurality of terminals.

The base station obtains channel state information CSI and receive bandwidth information of the terminals, and determines a first resource allocation unit, that is, a size of a first-type RBG, based on the receive bandwidth. The base station determines, based on the CSI of the terminal UEs, sizes and frequency-domain locations of PDSCH resources scheduled to the terminals.

Step 902: The base station groups the plurality of terminals based on the receive bandwidth, and configures a same level-1 control channel for terminals in a same group.

The base station groups the different accessed UEs based on the receive bandwidth of the UEs and a PDSCH resource scheduling status.

Figure 10:
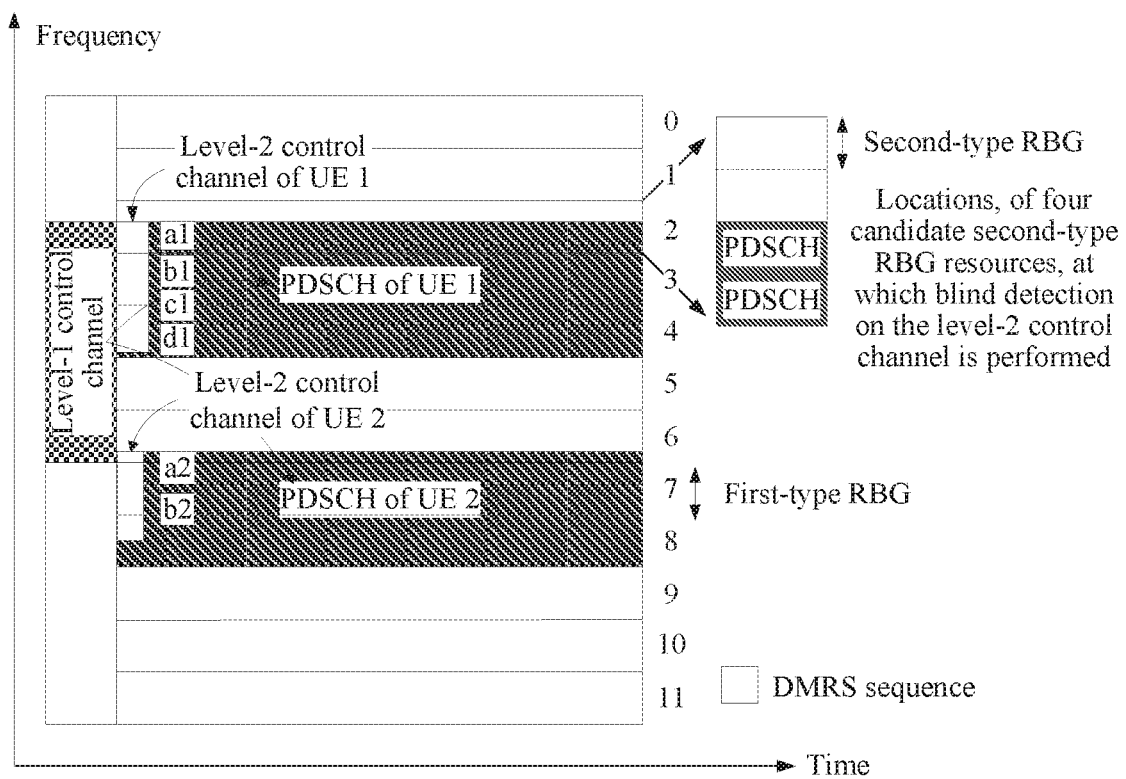
FIG. 10 is a schematic diagram of another PDSCH resource allocation through joint indication by using control channels of two levels according to an embodiment of this application.

If a plurality of UEs operate on same receive bandwidth, to-be-scheduled PDSCH resources are distributed in frequency domain in a relatively centralized manner, and sizes of resources occupied by level-2 control channels in time domain and frequency domain are the same, the base station classifies these UEs into a group. The base station configures a same level-1 control channel for the UEs in the group, as shown in FIG. 10, and divides the receive bandwidth into bandwidth regions for the UEs in the group based on the same size of the first-type RBG. The size of the first-type RBG may be determined by using the method described in step 401 to step 404 in the foregoing embodiment.

Step 903: The base station generates, based on channel state information and receive bandwidth information, first information that is used for determining a frequency domain resource range used by downlink data channels.

Second information is generated based on the channel information, locations of frequency domain resources of downlink data channels configured to the terminals, and the first information. The second information is mainly used to indicate a location of a frequency domain resource occupied by a downlink data resource within the first range.

A difference between this step and the foregoing embodiment is that a bitmap in DCI in the level-1 control channel is used to indicate a location, on the UE receive bandwidth, of a bandwidth region set in which PDSCH resources of all the UEs in the group are located.

Step 904: The base station generates second information based on the first information and the channel state information, where the second information is used to indicate a location of a downlink data resource within the frequency domain resource range.

Step 905: The base station sends the unique level-1 control channel to the terminals in the group.

Step 906: The base station sends, to each terminal in the same group, a level-2 control channel and a PDSCH resource corresponding to each terminal, where the level-1 control channel includes the first information, and the level-2 control channel includes the second information.

Step 907: After receiving downlink channels of the same group, including the level-1 control channel, the level-2 control channels, and the PDSCH resources, the terminals demodulate the level-1 control channel, to obtain the second information from the level-1 control channel, where the second information includes first indication information, second indication information, and first configuration information. Each terminal in the group performs, based on the second information, blind detection on the level-2 control channel that belongs to the terminal.

After receiving and demodulating the level-1 control channel, the UEs classified into the same group obtain bitmap information in the DCI. The bitmap indicates the bandwidth region set in which the PDSCH resources of all the UEs in the group are located. Therefore, in a bandwidth region corresponding to each bit set to "1" in the bitmap, there may be a starting resource location of a level-2 control channel of UE in the group. In this case, each UE in the group may need to perform blind detection on a level-2 control channel in the bandwidth region corresponding to each bit set to "1" in the bitmap. A blind detection method is the same as that described in step 801 to step 804 in the foregoing embodiment.

Step 908: Each terminal demodulates the level-2 control channel based on the first information, to obtain third indication information from the level-2 control channel. Each terminal determines a location of a downlink data channel resource in frequency domain based on the third indication information, the first indication information, and the first configuration information.

Step 909: Each terminal obtains allocation information about the PDSCH frequency domain resource based on the third indication information, the first indication information, and the first configuration information.

Further, the foregoing method further includes step 910: Further obtain second configuration information by performing blind detection on the second information. The second configuration information is used for determining a manner in which a PDSCH frequency domain resource scheduled by the base station to the terminal next time is allocated.

According to the method provided in this embodiment, the base station groups the plurality of terminals, and further when configuring a resource location in frequency domain for each terminal, uses the same level-1 control channel to indicate, simultaneously for a group of terminals, for example, for a plurality of UEs, the location of the bandwidth region set in which the PDSCH resource is located, thereby preventing the base station from generating the first information in the level-1 control channel for each terminal, and further reducing overheads of the level-1 control channel.

In addition, compared with a downlink resource allocation method in LTE, the method provided in this aspect has the following improvement: PDSCH resource allocation information is no longer terminal-UE-specific, and some of resource allocation information may simultaneously indicate frequency domain location regions in which PDSCHs of a plurality of terminals are located. Therefore, overheads of resource allocation information are further reduced.

Figure 11:
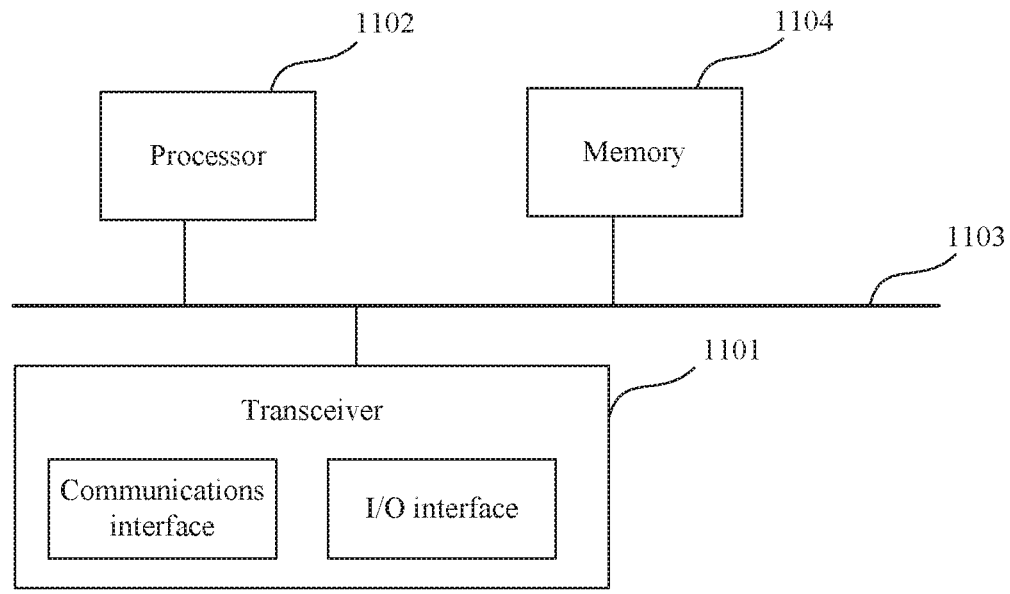
FIG. 11 is a schematic structural diagram of a base station according to an embodiment of this application.

This application further provides a base station, as shown in FIG. 11, applied to a two-level control channel structure that includes a level-1 control channel and a level-2 control channel. The base station includes a transceiver 1101 and a processor 1102. The transceiver 1101 includes at least one communications interface and/or an I/O interface. In addition, the base station further includes a communications bus 1103 and a memory 1104.

The transceiver 1101 is configured to obtain receive bandwidth of a terminal.

The processor 1102 is configured to generate first information based on the receive bandwidth, where the first information is used for determining a frequency domain resource range used by a downlink data channel.

The processor 1102 is further configured to generate second information based on the first information, where the second information is used to indicate a location of the downlink data channel within the frequency domain resource range.

The transceiver 1101 is further configured to: send the first information to the terminal through the level-1 control channel, and send the second information to the terminal through the level-2 control channel.

Optionally, the receive bandwidth includes at least one first resource element; and the processor 1102 is further specifically configured to: determine a size of the first resource element based on the receive bandwidth; determine, based on the size of the first resource element, a location of the first resource element occupied within the frequency domain resource range; and generate the first information based on the location of the first resource element and the size of the first resource element.

Optionally, the processor 1102 is further configured to determine the size of the first resource element based on a predefined correspondence between the receive bandwidth and the size of the first resource element; and is further configured to: configure the size of the first resource element in a dynamic or semi-static manner by using radio resource control higher layer signaling.

Optionally, each of the at least one first resource element includes a plurality of second resource elements, and the first information further includes first configuration information used for configuring a size of the second resource element.

The processor 1102 is further specifically configured to: determine, based on the size of the second resource element, a location of the downlink data channel in the second resource element occupied within the frequency domain resource range.

The second information includes third indication information. The third indication information is used to indicate a bitmap of the downlink data channel within the frequency domain resource range. The bitmap includes at least one bit, and each of the at least one bit indicates one second resource element. That the first information is used for determining a frequency domain resource range used by a downlink data channel includes: the first information includes first indication information, where the first indication information is used to indicate a bitmap of the frequency domain resource range on the receive bandwidth; and the bitmap includes at least one bit, and each of the at least one bit indicates one first resource element. The first information further includes second indication information. The second indication information is used to indicate configuration information of the level-2 control channel. The second indication information includes a quantity of OFDM symbols occupied by the level-2 control channel and a quantity of control channel elements used by the level-2 control channel.

Optionally, the second information further includes second configuration information, and the second configuration information is used to indicate a manner in which a downlink data channel resource scheduled by the base station to the terminal next time is allocated.

The transceiver 1101 and the processor 1102 of the base station in this embodiment may alternatively be a transceiver unit and a processing unit, respectively. The transceiver unit and the processing unit are configured to perform all functions of the transceiver 1101 and the processor 1102 in this embodiment, respectively.

Figure 12:
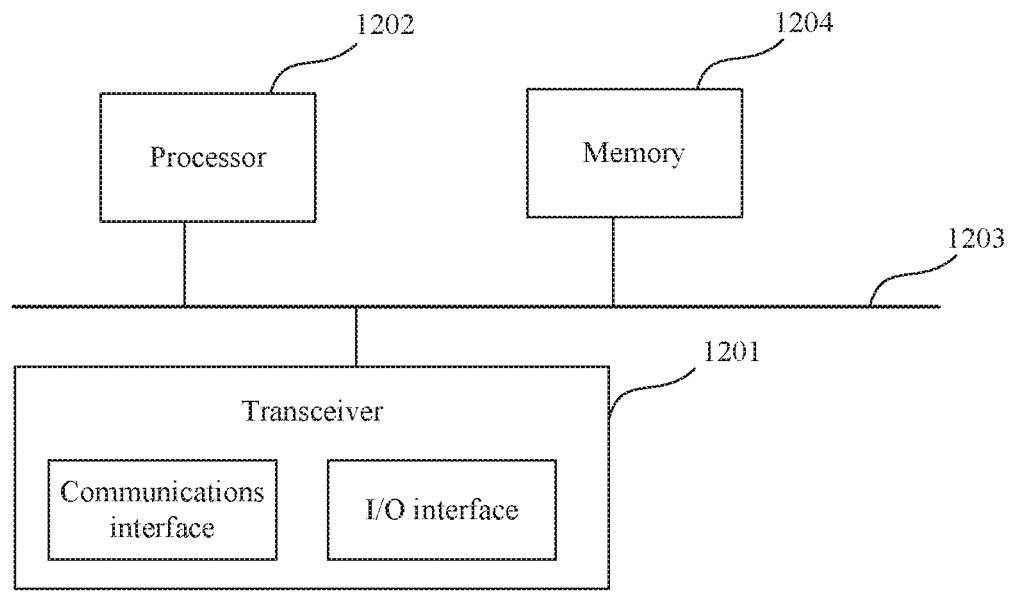
FIG. 12 is a schematic structural diagram of a terminal according to an embodiment of this application.

This application further provides a terminal, as shown in FIG. 12, corresponding to a base station. The terminal includes a transceiver 1201 and a processor 1202. The transceiver 1201 includes at least one communications interface and/or an I/O interface. In addition, the terminal further includes a communications bus 1203 and a memory 1204.

The transceiver 1201 is configured to receive a level-1 control channel and a level-2 control channel that are sent by a base station.

The processor 1202 is configured to demodulate the level-1 control channel, to obtain first information, where the first information is used for determining a frequency domain resource range used by a downlink data channel.

The processor 1202 is further configured to demodulate the level-2 control channel based on the first information, to obtain second information from the level-2 control channel, where the second information is used to indicate a location of a downlink data resource within the frequency domain resource range.

The processor 1202 is further configured to determine a location of the downlink data resource in frequency domain based on the second information and the first information.

Optionally, the first information includes second indication information; and the processor 1202 is further specifically configured to: obtain, based on the second indication information, sizes of resources occupied by the level-2 control channel in time domain and frequency domain; and demodulate the level-2 control channel based on the second indication information, and generate the second information, where the second information includes third indication information, and the third indication information is used to indicate a bitmap of the downlink data channel within the frequency domain resource range.

If the second information further includes second configuration information, the processor 1202 is further configured to determine, based on the second configuration information, a manner in which a downlink data channel resource scheduled by the base station to the processor 1202 next time is allocated.

In addition, the transceiver 1201 and the processor 1202 of the terminal in this embodiment may alternatively be a transceiver unit and a processing unit, respectively. The transceiver unit and the processing unit are configured to perform all functions of the transceiver 1201 and the processor 1202 in this embodiment, respectively.

The base station and terminal devices provided in the embodiments of this application implement the following beneficial effects:

First: The base station divides the UE receive bandwidth into a plurality of bandwidth regions based on the first resource element, for example, the first-type RBG. The first indication information in the level-1 control channel is used to indicate the bandwidth region set in which the PDSCH resource is located. The bandwidth regions are obtained through division by using the first-type RBG that is of a relatively large frequency domain granularity, thereby reducing information indication overheads used by the level-1 control channel for downlink resource allocation and improving a capacity of the level-1 control channel.

Second: The base station flexibly configures the second resource element, for example, the size of the second-type RBG, based on the PDSCH resource scheduling status, thereby improving flexibility of PDSCH resource scheduling and fully utilizing frequency selection performance.

Third: In the bandwidth region set indicated by the second information in the level-1 control channel, the level-2 control channel is further used to indicate the location of the PDSCH resource in the bandwidth region set, thereby reducing a range that is of the location of the PDSCH resource in frequency domain and that is indicated by resource allocation information, and reducing overheads of downlink resource allocation information in the control channel.

Fourth: When configuring the locations of the downlink resources for the same group, the base station uses a level-1 control channel to indicate, simultaneously for the plurality of UEs in the group, the bandwidth region set in which the PDSCH is located, further reducing overheads of downlink resource allocation information.

This application further provides a resource configuration system. The system includes a base station and a terminal, and is applied to a two-level control channel structure that includes a level-1 control channel and a level-2 control channel.

The base station is configured to: obtain receive bandwidth of the terminal; generate first information based on the receive bandwidth, where the first information is used for determining a frequency domain resource range used by a downlink data channel; generate second information based on the first information, where the second information is used to indicate a location of the downlink data channel within the frequency domain resource range; and send the first information to the terminal through the level-1 control channel, and send the second information to the terminal through the level-2 control channel.

The terminal is configured to: receive a level-1 control channel and a level-2 control channel that are sent by the base station; demodulate the level-1 control channel, to obtain first information, where the first information is used for determining a frequency domain resource range used by a downlink data channel; demodulate the level-2 control channel based on the first information, to obtain second information from the level-2 control channel, where the second information is used to indicate a location of a downlink data resource within the frequency domain resource range; and determine a location of the downlink data resource in frequency domain based on the second information and the first information.

In addition, if the system includes at least one terminal, the base station is further configured to: obtain receive bandwidth reported by a plurality of terminals; and group the plurality of terminals based on the receive bandwidth, and configure a same level-1 control channel for terminals in a same group; and the base station is further configured to generate first information and second information based on channel state information and receive bandwidth information, where the second information is used to indicate a location of a downlink data resource within a frequency domain resource range.

The base station is further configured to send the level-1 control channel to the terminals in the group, and send a level-2 control channel to each terminal in the same group, so that after receiving and demodulating the level-1 control channel, each terminal obtains the first information, performs blind detection on the level-2 control channel based on the first information, and obtains a location of a PDSCH resource in frequency domain, thereby avoiding that the base station generates the first information in the level-1 control channel for each terminal, and further reducing overheads of the level-1 control channel.

Further, the processor may be a general-purpose central processing unit (CPU), a microprocessor, an application-specific integrated circuit (ASIC), or one or more integrated circuits configured to control program execution in the solutions of the present disclosure.

The memory may be a read-only memory (ROM) or another type of static storage device capable of storing static information and instructions, or a random access memory (RAM) or another type of dynamic storage device capable of storing information and instructions; or may be an electrically erasable programmable read-only memory (EEPROM), a compact disc read-only memory (CD-ROM) or another compact disc storage, an optical disc storage (including a compressed optical disc, a laser disc, an optical disc, a digital universal optical disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. The memory may independently exist, or may be integrated into the processor. The memory is configured to store application program code used to execute the solutions of the present disclosure, where the application program code is executed under control of the processor. The processor is configured to execute the application program code stored in the memory.

In the foregoing embodiments, the "unit" may be an application-specific integrated circuit (ASIC), a circuit, a processor that executes one or more software or firmware programs and a memory, an integrated logic circuit, and/or another device that can provide the foregoing functions.

Figure 8:
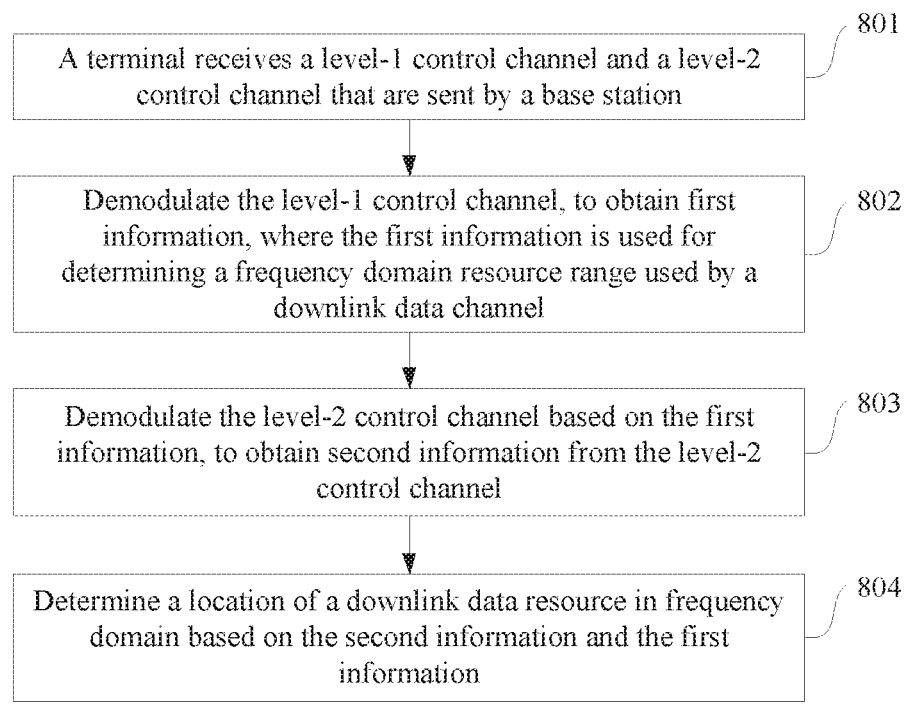
FIG. 8 is a schematic flowchart of a resource receiving method according to an embodiment of this application.

The embodiments of the present disclosure further provide a computer storage medium, configured to store a computer software instruction used by the resource configuration method and the resource receiving method shown in FIG. 4, FIG. 8, or FIG. 9. The computer storage medium includes a program used to execute the foregoing method embodiments. After the stored program is executed, a feedback parameter can be sent.

Although the present disclosure is described with reference to the embodiments, in a process of implementing the present disclosure that claims protection, a person skilled in the art may understand and implement other variations of the disclosed embodiments by viewing the accompanying drawings, disclosed content, and the accompanying claims. In the claims, "comprising" does not exclude another component or another step, and "a" or "one" does not exclude a case of multiple. A single processor or another unit may implement several functions enumerated in the claims. The fact that some measures are recited in mutually different dependent claims does not indicate that a combination of these measures cannot bring better effects.

A person skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code. The computer program is stored/distributed in an appropriate medium, provided with other hardware or as a part of hardware, or may be distributed in another form such as in the Internet or in another wired or wireless telecommunications system.

The present disclosure is described with reference to the flowcharts and/or block diagrams of the method, the apparatus (device), and the computer program product in the embodiments of the present disclosure. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These computer program instructions may alternatively be stored in a computer-readable memory that can instruct the computer or any other programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Although the present disclosure is described with reference to specific features and the embodiments thereof, obviously, various modifications and combinations may be made to them without departing from the spirit and scope of the present disclosure. Correspondingly, this specification and accompanying drawings are merely examples for description of the present disclosure defined by the claims, and are intended to cover any of or all modifications, variations, combinations or equivalents within the scope of the present disclosure. Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A resource configuration method, applied to a two-level control channel structure having a level-1 control channel and a level-2 control channel, the method comprising:
    obtaining, by a base station, receive bandwidth of a terminal, wherein the receive bandwidth of the terminal comprises at least one first resource element;
    generating, by the base station, first information based on the receive bandwidth, wherein the first information is used for determining a frequency domain resource range used by a downlink data channel, and generating the first information based on the receive bandwidth comprises:
        determining, by the base station, a size of the first resource element based on the receive bandwidth;
        determining, by the base station based on the size of the first resource element, a location of the first resource element occupied within the frequency domain resource range; and
        generating, by the base station, the first information based on the location of the first resource element and the size of the first resource element;
    generating, by the base station, second information based on the first information, wherein the second information is used to indicate a location of the downlink data channel within the frequency domain resource range; and
    sending, by the base station, the first information to the terminal through the level-1 control channel, and sending the second information to the terminal through the level-2 control channel.

2. The method according to claim 1, wherein determining, by the base station, a size of the first resource element based on the receive bandwidth comprises:
    determining the size of the first resource element based on a predefined correspondence between the receive bandwidth and the size of the first resource element.

3. The method according to claim 1, wherein determining, by the base station, a size of the first resource element based on the receive bandwidth comprises:
    configuring, by the base station, the size of the first resource element in a dynamic or semi-static manner by using radio resource control higher layer signaling.

4. The method according to claim 1, wherein:
    each of the at least one first resource element comprises a plurality of second resource elements;
    the first information further comprises first configuration information used for configuring a size of each of the plurality of second resource elements; and
    the second information indicates a location of the downlink data channel in the plurality of second resource element occupied within the frequency domain resource range.

5. The method according to claim 4, wherein the second information comprises third indication information used to indicate a bitmap of the downlink data channel within the frequency domain resource range, wherein the bitmap within the frequency domain resource range comprises at least one bit, and each of the at least one bit indicates one second resource element.

6. The method according to claim 1, wherein the first information comprises first indication information used to indicate a bitmap of the frequency domain resource range on the receive bandwidth, wherein the bitmap on the receive bandwidth comprises at least one bit, and each of the at least one bit indicates one first resource element.

7. A base station, applied to a two-level control channel structure that comprises a level-1 control channel and a level-2 control channel, the base station comprising:
a processor; and
a storage medium comprising executable instructions which, when executed by the processor, cause the apparatus to:
obtain receive bandwidth of a terminal, wherein the receive bandwidth of the terminal comprises at least one first resource element,
generate first information based on the receive bandwidth, wherein:
the first information is used for determining a frequency domain resource range used by a downlink data channel; and
generating the first information based on the receive bandwidth comprises:
determining a size of the first resource element based on the receive bandwidth;
determining, based on the size of the first resource element, a location of the first resource element occupied within the frequency domain resource range; and
generating the first information based on the location of the first resource element and the size of the first resource element,
generate second information based on the first information, wherein the second information is used to indicate a location of the downlink data channel within the frequency domain resource range, and
send the first information to the terminal through the level-1 control channel, and send the second information to the terminal through the level-2 control channel.

8. The base station according to claim 7, wherein the executable instructions, when executed by the processor, further cause the apparatus to:
determine the size of the first resource element based on a predefined correspondence between the receive bandwidth and the size of the first resource element.

9. The base station according to claim 7, wherein the executable instructions, when executed by the processor, further cause the apparatus to:
configure the size of the first resource element in a dynamic or semi-static manner by using radio resource control higher layer signaling.

10. The base station according to claim 7, wherein:
each of the at least one first resource element comprises a plurality of second resource elements;
the first information further comprises first configuration information used for configuring a size of each of the plurality of second resource elements; and
the executable instructions, when executed by the processor, further cause the apparatus to:
determine, based on the size of the second resource element, a location of the downlink data channel in the plurality of second resource elements occupied within the frequency domain resource range.

11. The base station according to claim 10, wherein the second information comprises third indication information used to indicate a bitmap of the downlink data channel within the frequency domain resource range, and wherein the bitmap within the frequency domain resource range comprises at least one bit, and each of the at least one bit indicates one second resource element.

12. The base station according to claim 7, wherein the first information comprises first indication information used to indicate a bitmap of the frequency domain resource range on the receive bandwidth, and wherein the bitmap on the receive bandwidth comprises at least one bit, and each of the at least one bit indicates one first resource element.

13. The base station according to claim 7, wherein the first information comprises second indication information used to indicate configuration information of the level-2 control channel.

14. The base station according to claim 13, wherein the second indication information comprises:
a quantity of OFDM symbols occupied by the level-2 control channel and a quantity of control channel elements used by the level-2 control channel.

15. The base station according to claim 7, wherein the second information comprises second configuration information used to indicate a manner in which a downlink data channel resource scheduled by the base station to the terminal next time is allocated.

16. A terminal, comprising:
a processor; and
a storage medium comprising executable instructions which, when executed by the processor, cause the apparatus to:
receive a level-1 control channel and a level-2 control channel that are sent by a base station,
demodulate the level-1 control channel to obtain first information, wherein the first information is used for determining a frequency domain resource range used by a downlink data channel,
demodulate the level-2 control channel based on the first information to obtain second information from the level-2 control channel, wherein the second information is used to indicate a location of a downlink data resource within the frequency domain resource range, and
determine a location of the downlink data resource in frequency domain based on the second information and the first information.

17. The terminal according to claim 16, wherein:
the first information comprises second indication information; and
the executable instructions, when executed by the processor, further cause the apparatus to:
obtain, based on the second indication information, sizes of resources occupied by the level-2 control channel in time domain and frequency domain,
demodulate the level-2 control channel based on the second indication information, and
generate the second information, wherein the second information comprises third indication information used to indicate a bitmap of the downlink data channel within the frequency domain resource range.

18. The terminal according to claim 16, wherein:
the second information comprises second configuration information; and
the executable instructions, when executed by the processor, further cause the apparatus to:
determine, based on the second configuration information, a manner in which a downlink data channel resource scheduled by the base station to the processor next time is allocated.

* * * * *